June 21, 1966  J. O. PILCHER II  3,256,816
EXTENDING BOOM FOR SOUNDING ROCKETS
Filed Sept. 10, 1964  2 Sheets-Sheet 1
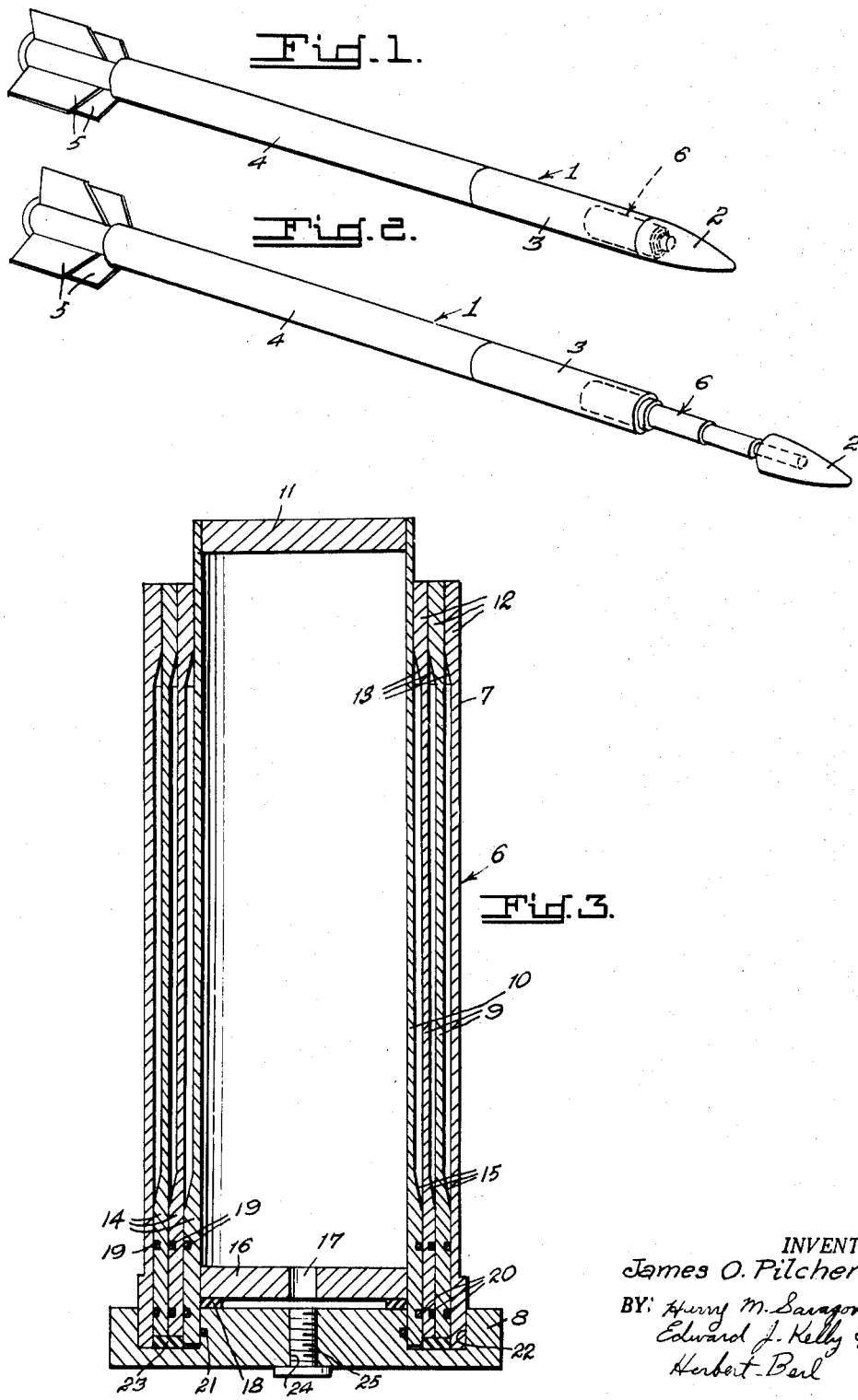
INVENTOR.
James O. Pilcher II June 21, 1966  J. O. PILCHER II  3,256,816
EXTENDING BOOM FOR SOUNDING ROCKETS
Filed Sept. 10, 1964                              2 Sheets-Sheet 2
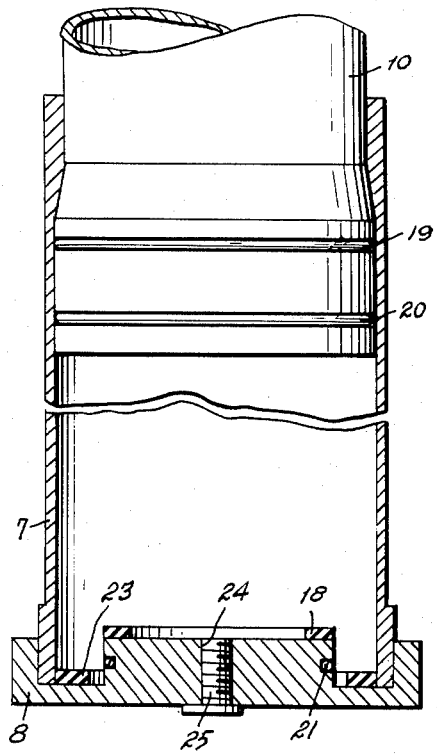
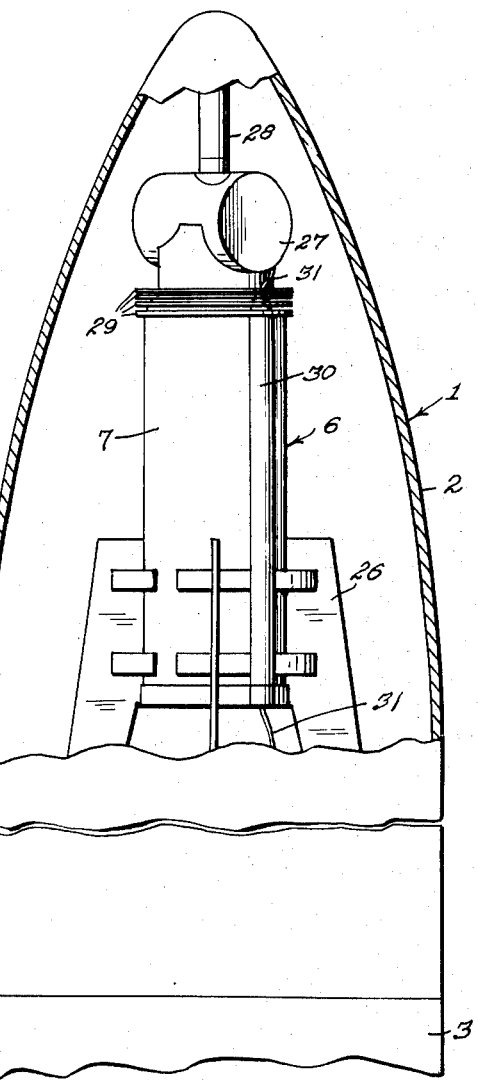
INVENTOR.
James O. Pilcher II
BY: Harry M. Saragovitz,
Edward J. Kelly &
Herbert Berl

United States Patent Office

3,256,816
Patented June 21, 1966

3,256,816
EXTENDING BOOM FOR SOUNDING ROCKETS
James O. Pilcher II, Aberdeen, Md., assignor to the United States of America as represented by the Secretary of the Army
Filed Sept. 10, 1964, Ser. No. 395,628
4 Claims. (Cl. 102—49)

The invention described herein may be manufactured and used by or for the Government for governmental purposes, without the payment to me of any royalty thereon.

This invention relates to an Extending Boom For Sounding Rockets and more particularly to a device that displaces an instrument away from the main body of a rocket and then holds that instrument at the new position for the remainder of the rocket flight.

The extending boom of this invention is especially designed for the purpose of removing instruments that may be influenced by magnetic fields from the source thereof. One such instrument, for example, being a proton-precession magnetometer.

Existing extension devices have at least one or more deficiencies as follows: insufficient displacement, insufficient strength, insufficient rigidity, excessive accelerations during extension and adverse electric and magnetic properties.

The device of the invention is nonmetallic and does not exhibit magnetic fields and eddy currents which would interfere with the instrument carried thereby, and cause errors in measurement by the instrument.

An application of the present invention is in the Nike-Apache sounding rocket wherein the device of the invention will displace a pair of proton-precession magnetometers approximately three feet away from the auxiliary pay load instrumentation.

The device of the invention also acts as an integral part of the pay load structure of the rocket and is of sufficient strength to support the whole forward section of the pay load structure in its extended position. It is further capable of being stowed in the rocket's nosecone. It is of utmost importance that the environment placed on the magnetometer by the invention must not degrade or impair the capability of the instrument or its components.

It is the object of this invention to displace a rocket-borne instrument, or instrument system, a given distance away from auxiliary instrumentation and pay load structure that may cause electric and magnetic interferences and to hold the instrument at the new position throughout the flight of the rocket.

Another object is to provide an extending boom for a sounding rocket comprising a series of nonmetallic nesting tubes which are caused by internal precomatic forces to extend and displace an instrument away from the auxiliary instrumentation of a rocket pay load.

A still further object is to provide an extending boom for a rocket that is economical and simple of structure.

The foregoing and other objects and advantages of the invention will become apparent from a study of the following specification, taken in conjunction with the accompanying drawings in which:

FIG. 1 is a schematic perspective view of a rocket showing the boom of the invention in dotted lines and being in collapsed position;

FIG. 2 is a similar view of the boom in its extended position;

FIG. 3 is a central sectional view of the boom, on a larger scale, and in its collapsed position;

FIG. 4 is a sectional detail view of one of the joints and base plate of the boom; and, FIG. 5 is a partial section of the nosecone of a rocket with the extending boom applied therein.

Referring now to the drawings reference character 1 (FIG. 1) designates generally a rocket, which may be of the Nike-Apache type. Rocket 1 includes an ogival section 2 (nosecone), a main instrument section 3, a body portion 4 and fins 5.

FIGS. 1 and 2 are for the sole purpose of illustrating the position of the extending boom in a rocket and its relation to the parts thereof. The extending boom is indicated generally by reference character 6. The instruments to be displaced from the rest of the rocket 1 are carried in section 2, and are not shown in these views.

The extending boom 6 is so mounted in a rocket that the ogive portion may be displaced from the rest of the rocket as shown in FIG. 2. The manner of mounting the boom 6 will, of course vary with the particular type of rocket in which it is used. In FIG. 5, for instance, it is mounted in the ogival section 2 only.

In FIG. 3, the extending boom 6 of the invention is shown in detail as separated from a rocket and is in collapsed position. The boom 6 comprises a series of telescopic tubes. (Four are shown.) These consist of an outer tube 7 which is fixed to a base plate 8. Slidable in outer tube 7 are tubes 9 and primary tube 10. Primary tube 10 is sealed at its outer end by a plate 11, which is flush with its outer edge.

Tubes 7 and 9 are provided with internal shoulders 12 having beveled inner faces 13 at their outer ends.

Tubes 9 and 10 are provided with external shoulders 14 having beveled outer faces 15.

An orifice plate 16 is fixed in primary tube 10 and disposed at a distance from its inner end. The plate 16 is provided with a central orifice 17.

The inner end of primary tube 10 is sealed by an annular gasket 18 which is bonded to the outer face of base plate 8.

Seals are provided between tubes 7, 9 and 10 by O-rings 19 and 20.

A further seal is provided between base plate 8 and primary tube 10 and consists of an O-ring 21.

Tubes 7, 9 and 10 are nested, when collapsed, in an annular well 22 in base plate 8, only outer tube 7 being fixed at its outer periphery to plate 8.

An annular gasket 23 bonded on the floor of well 22 seals the inner ends of tubes 9 when collapsed.

A central bore 24 internally threaded is provided in base plate 8 and is closed by a threaded plug 25.

The entire extending boom is preferably fabricated from fiber glass or like insulating material.

In FIG. 4, the extended boom is shown to be extended and this view illustrates the stationary elements, only the base of primary tube 10 being shown in fully extended position.

A practical application of the extending boom 6 in a rocket nosecone is shown in FIG. 5.

The extending boom 6 is mounted in a supporting structure 26 of any expedient design in the ogival portion 2 of rocket 1.

A case 27, containing a magnetometer or like instrument, or instruments, is fixed to the outer end of primary tube 10.

A restraining device 28 is provided and may consist of any expediently designed mechanism to hold the tubes 7, 9 and 10 in their collapsed position within the nosecone. Since this forms no part of the invention it need not be herein described.

The extending boom 6 may be provided with flanges 29 on their outer ends in order to support complementary tubes 30 which are telescopic as tubes 7, 9 and 10, but of smaller diameter for the purpose of conducting electrical cables 31 which connect instruments in case 27 to other instruments (not shown) in the main instrument section 3. The cables 31 may be stowed (not shown) in section 3.

*Operation*

Plug 25 is unscrewed and air is forced under pressure into the primary tube 10 through bore 24 and orifice 17, the pressure being one atmosphere, absolute. Then plug 25 is screwed into bore 24 sealing the air in primary tube 10.

When the rocket 1 becomes airborne, the restraining device 28 is caused to remove the restraint on primary tube 10 and the air, under pressure, therein forces the tubes 9 and 10 to extend until they are locked by the beveled inner and outer faces of shoulders 12 and 14 (see FIG. 4) and held in the new extended position. Ogival section 2 is, of course, displaced from the remainder of the rocket as indicated in FIG. 2. The complementary tubes 30 also extend, due to the flanges 29 to which they are fixed. Cables 31 are also payed out from section 3 as the tubes extend.

The extent of displacement of ogival section 3 will, of course, be determined by the number of and length of the tubes forming the boom 6.

The pressurized air will be retained in the primary tube 10 by O-rings 19 and 20 and plate 11. The orifice 17 will act as a throttle to govern the rate of extension of the boom 6 and the energy of impact at the end of its travel. Its size is determined to insure sufficient energy to operate the boom without causing damage to the instrument that is displaced by the boom.

The boom 6 will reach its fully extended position when the beveled outer faces 15 on external shoulders 14 engage the beveled inner faces 13 of internal shoulders 12. This will provide a jamming surface to lock the boom in its fully extended position.

The ogival section 2 is, of course, ejected by whatever mechanism that is provided. (Not shown.)

The angle of the inner faces 13 and outer faces 15 will be determined by the property of the tube material and the forces of impact of the mating shoulders.

The boom 6 can be preloaded at higher initial pressures for larger expansion ratios.

Variations and modifications may be effected without departing from the scope of the novel concept of the present invention as set forth in the appended claims.

What is claimed is:

1. In combination with a rocket including a body section, a main instrument section and a separable ogival section; slidable, telescopic means connected to said main instrument section and said ogival section whereby said ogival section may be extended a predetermined distance from the remaining sections of said rocket and means carried by said telescopic means for locking said ogival section in that position.

2. In combination, a rocket having an axial line of symmetry said rocket including a body section, a main instrument section and a separable ogival section, and an extending boom connected to said main instrument section and said ogival section for displacing said ogival section a predetermined distance from said main instrument section, said extending boom comprising a series of telescopic tubes, said tubes adapted to be normally held in collapsed position and released during flight of said rocket to displace said ogival section a predetermined distance from the remaining sections of said rocket and means carried by the ends of said tubes for locking said tubes in said extended position throughout the flight of said rocket.

3. In combination with a rocket having an axial line of symmetry and including a body section, a main instrument section and a separable ogival section and a telescopic extending boom normally held in a collapsed position in said rocket, said boom being connected to said main instrument section and said ogival section and comprising a base plate having an annular well therein, an outer tube secured in said well to said base plate, at least one inner tube slidable within said outer tube, a primary tube slideable within said inner tube, said primary tube being sealed at its outer end thereof, a plate fixed in the other end of said primary tube and spaced therefrom, there being an orifice therein, said base plate having a threaded bore therein, a threaded plug closing said orifice in said last named plate, sealing elements mounted on said inner tube, said primary tube and said base plate for hermetically sealing said tubes whereby when said primary tube is filled with pressurised air through said threaded bore in said base plate, said tubes will, upon release thereof, extend to their fully extended position to displace said ogival section from the remainder of said rocket and means carried by said tubes to jam said tubes in said fully extended position.

4. A device of the character set forth in claim 3 wherein said means to jam said tubes in said fully extended position comprises a thickened internal shoulder in the wall of the outer end of said outer tube and inner tubes, an external shoulder in the wall of the inner and primary tubes, each shoulder having opposing beveled faces whereby when said tubes reach their fully extended position, said faces will jam said tubes in said position.

References Cited by the Examiner

UNITED STATES PATENTS

| 2,297,130 | 9/1942 | Bomar | 102—50 |
| 3,001,395 | 9/1961 | Leiss et al. | 244—14 X |
| 3,086,467 | 4/1963 | Gallagher et al. | 102—50 |

BENJAMIN A. BORCHELT, *Primary Examiner.*

V. R. PENDEGRASS, *Assistant Examiner.*